United States Patent
Yoo et al.

(10) Patent No.: US 11,592,311 B2
(45) Date of Patent: Feb. 28, 2023

(54) METHOD AND APPARATUS FOR DISPLAYING SURROUNDING INFORMATION USING AUGMENTED REALITY

(71) Applicant: Samsung Electronics Co., Ltd., Suwon-si (KR)

(72) Inventors: Jinwoo Yoo, Suwon-si (KR); Sanghyuk Koh, Suwon-si (KR); Seunghyun Lee, Suwon-si (KR); Donghoon Kim, Suwon-si (KR); Jooyoung Son, Suwon-si (KR); Dasom Lee, Suwon-si (KR); Yonggu Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 313 days.

(21) Appl. No.: 16/795,400

(22) Filed: Feb. 19, 2020

(65) Prior Publication Data

US 2020/0264007 A1    Aug. 20, 2020

(30) Foreign Application Priority Data

Feb. 19, 2019    (KR) .......................... 10-2019-0019172

(51) Int. Cl.
*G01C 21/36* (2006.01)
*G06Q 30/02* (2012.01)
(Continued)

(52) U.S. Cl.
CPC ..... *G01C 21/3679* (2013.01); *G01C 21/3647* (2013.01); *G06Q 30/0261* (2013.01);
(Continued)

(58) Field of Classification Search
None
See application file for complete search history.

(56) References Cited

U.S. PATENT DOCUMENTS 9,710,554 B2    7/2017    Sandberg
9,870,642 B2    1/2018    Fialho et al.
(Continued)

FOREIGN PATENT DOCUMENTS

JP    5405412 B2    2/2014
KR    10-1205485 B1    11/2012
(Continued)

OTHER PUBLICATIONS

International Search Report and Written Opinion of the International Searching Authority in connection with International Application No. PCT/KR2020/002246 dated Jun. 11, 2020, 9 pages.
(Continued)

*Primary Examiner* — Ryan M Gray

(57) ABSTRACT

A method of displaying a nearby point of interest (POI) using augmented reality and an electronic device thereof. An operation method of an electronic device includes: acquiring a preview video; acquiring location information of the electronic device; acquiring information on at least one POI located in a vicinity; selecting a focus POI among at least one POI; determining first information to be provided to a user for general POIs; determining second information including more information than the first information to be provided to the user for the focus POI; determining a location on a screen on which the preview video in which the information on the at least one POI is to be displayed; and displaying the first information or the second information on the location on the screen on which the determined preview video of all or some of the at least one POI is provided.

18 Claims, 10 Drawing Sheets

(51) Int. Cl.
  *G06T 19/00* (2011.01)
  *G06T 7/73* (2017.01)
  *G06V 20/20* (2022.01)
  *G06Q 30/0251* (2023.01)

(52) U.S. Cl.
  CPC .............. *G06T 7/74* (2017.01); *G06T 19/006* (2013.01); *G06V 20/20* (2022.01); *G06T 2207/20101* (2013.01)

(56) References Cited

U.S. PATENT DOCUMENTS

| | | | | |
|---|---|---|---|---|
| 2011/0071757 A1* | 3/2011 | Lee | ........................ | G03B 13/10 |
| | | | | 701/532 |
| 2011/0279446 A1* | 11/2011 | Castro | ..................... | G06T 15/20 |
| | | | | 345/419 |
| 2012/0038671 A1 | 2/2012 | Min et al. | | |
| 2012/0122491 A1* | 5/2012 | Kim | ...................... | H04L 67/535 |
| | | | | 455/456.3 |
| 2012/0176410 A1* | 7/2012 | Meier | ..................... | G06T 15/20 |
| | | | | 345/633 |
| 2012/0223966 A1* | 9/2012 | Lim | ........................ | G06T 11/60 |
| | | | | 345/633 |
| 2019/0347683 A1* | 11/2019 | Li | ....................... | G06Q 30/0261 |
| 2020/0264007 A1* | 8/2020 | Yoo | ........................... | G06T 7/74 |
| 2022/0092864 A1* | 3/2022 | Baltieri | ..................... | G06T 7/74 |

FOREIGN PATENT DOCUMENTS

| | | |
|---|---|---|
| KR | 10-1329882 B1 | 11/2013 |
| KR | 10-1658087 B1 | 9/2016 |
| KR | 10-1659089 B1 | 9/2016 |
| KR | 10-2017-0007514 A | 1/2017 |
| KR | 10-1921743 B1 | 2/2019 |
| KR | 10-2125556 B1 | 6/2020 |
| WO | 2014169692 A1 | 10/2014 |

OTHER PUBLICATIONS

Supplementary European Search Report dated Feb. 18, 2022, in connection with European Application No. 20759343.5, 8 pages.
Notice of Preliminary Rejection dated Nov. 25, 2022, in connection with Korean Application No. 10-2019-0019172, 12 pages.

* cited by examiner

METHOD AND APPARATUS FOR DISPLAYING SURROUNDING INFORMATION USING AUGMENTED REALITY

CROSS-REFERENCE TO RELATED APPLICATION

This application is based on and claims priority under 35 U.S.C. 119 to Korean Patent Application No. 10-2019-0019172, filed on Feb. 19, 2019, in the Korean Intellectual Property Office, the disclosure of which is herein incorporated by reference in its entirety.

BACKGROUND

1. Field

Various embodiments relate to a method and apparatus for displaying a nearby point of interest (POI) using augmented reality.

2. Description of Related Art

As smartphones interact with the Internet and data becomes freely available, users tend to obtain necessary information immediately. For example, a user often searches for information on nearby restaurants or interest-related information by using a smartphone. In this case, various map applications are used to include a function of displaying the information searched by the user on a map.

In a map application, the current location of the user and the searched location or place may be displayed together and may be displayed by different icons depending on the property of the place to be searched. However, the map application is still limited to simply displaying a location searched based on a search term, and thus there is room for further improvement.

The above information is presented as background information only to assist with an understanding of the disclosure. No determination has been made, and no assertion is made, as to whether any of the above might be applicable as prior art with regard to the disclosure.

SUMMARY

A conventional map application can help a user to navigate to a desired place by displaying the location of nearby places on a map. However, in order to get to the desired place only by the location on the map, it is inconvenient to look at the surrounding environment such as roads, buildings, and etc., to find out the direction.

An aspect of the disclosure is to provide a method and apparatus for assisting a user to easily go to a desired place by informing a direction of a current location reference along with a camera preview screen as well as location information of a point of interest (POI) when searching for a nearby location.

Another aspect of the disclosure is to provide a method and apparatus for allowing a user to check various information by providing information associated with a corresponding place, such as a coupon provided at the corresponding place, in addition to the simple location of a POI.

Still another aspect of the disclosure is to provide a method and apparatus for increasing the readability by showing information that can be more usefully used to a user differently from other information.

The technical subjects pursued in the disclosure may not be limited to the above mentioned technical subjects, and other technical subjects which are not mentioned may be clearly understood, through the following descriptions, by those skilled in the art of the disclosure.

In accordance with an aspect of the disclosure, an electronic device includes: a communication module configured to perform communication with an external device; a camera module configured to capture a video; at least one processor configured to be operatively connected to the communication module and the camera module; and at least one memory configured to be operatively connected to the at least one processor, wherein the at least one memory stores, when executed, instructions for causing the at least one processor to acquire a preview video captured by the camera module by controlling the camera module, to acquire location information of the electronic device, to acquire information on at least one point of interest (POI) located in the vicinity based on the location information, to select a focus POI among at least one POI based on information on the at least one POI, to determine first information to be provided to a user for general POIs including the remaining POIs except the selected focus POI among the at least one POI, to determine second information to be provided to the user for the focus POI, wherein the second information includes more information than the first information, to determine a location on a screen on which the preview video in which the information on the at least one POI is to be displayed is provided, and to display to provide the first information or the second information on the location on the screen on which the determined preview video of all or some of the at least one POI is provided.

In accordance with another aspect of the disclosure, an operation method of an electronic device includes: acquiring a preview video captured by a camera module; acquiring location information of the electronic device; acquiring information on at least one POI located in the vicinity based on the location information; selecting a focus POI among at least one POI based on information on the at least one POI; determining first information to be provided to a user for general POIs including the remaining POIs except the selected focus POI among the at least one POI; determining second information including more information than the first information to be provided to the user for the focus POI; determining a location on a screen on which the preview video in which the information on the at least one POI is to be displayed is provided; and displaying to provide the first information or the second information on the location on the screen on which the determined preview video of all or some of the at least one POI is provided.

In accordance with still another aspect of the disclosure, an operation method of an electronic device includes: transmitting location information of the electronic device to a content provider (CP) server; acquiring information on at least one POI located in the vicinity from the CP server; arranging the at least one POI according to a distance from the electronic device based on the location information of the electronic device; configuring a display position of each POI of the at least one POI based on a the location of the electronic device and a preview video capturing direction of the electronic device; configuring, when the display position is a focus POI within a configured focus region, information to be displayed in relation to the focus POI and displaying a UI including the configured information at the configured display position on the screen on which the preview video is displayed; and acquiring, when the display position is a general POI which is out of the configured focus region, category information of the general POI and displaying an icon corresponding to the category at the configured display position on the screen on which the preview video is displayed.

The method according to various embodiments and the electronic device thereof may provide, to a user, location information on a screen on which the user captures in addition to a method of obtaining information about a place through a fixed map image, thereby providing location information easier to find.

The method according to various embodiments and the electronic device thereof may provide information related to a corresponding place in addition to a simple location, thereby allowing a user to check various information.

The method according to various embodiments and the electronic device thereof may show information that can be more usefully used to a user in a more detailed manner than other information, thereby increasing the readability of the user.

Effects which can be acquired by the disclosure are not limited to the above described effects, and other effects that have not been mentioned may be clearly understood by those skilled in the art from the following description.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

In relation with the description of the drawings, the same or similar reference numerals may be used for the same or similar components.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, with reference to the accompanying drawings, various embodiments will be descried in detail.

Figure 1:
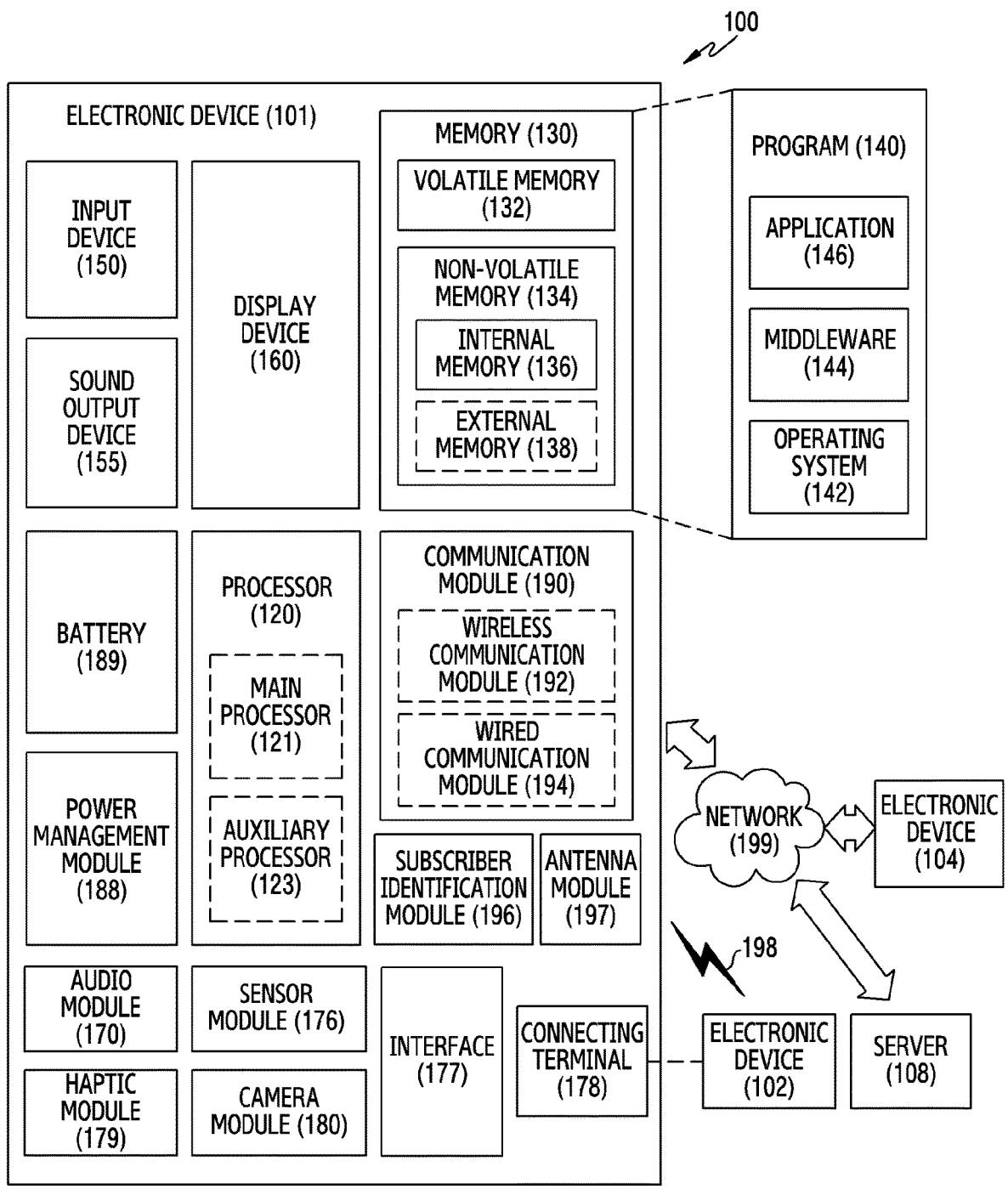
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
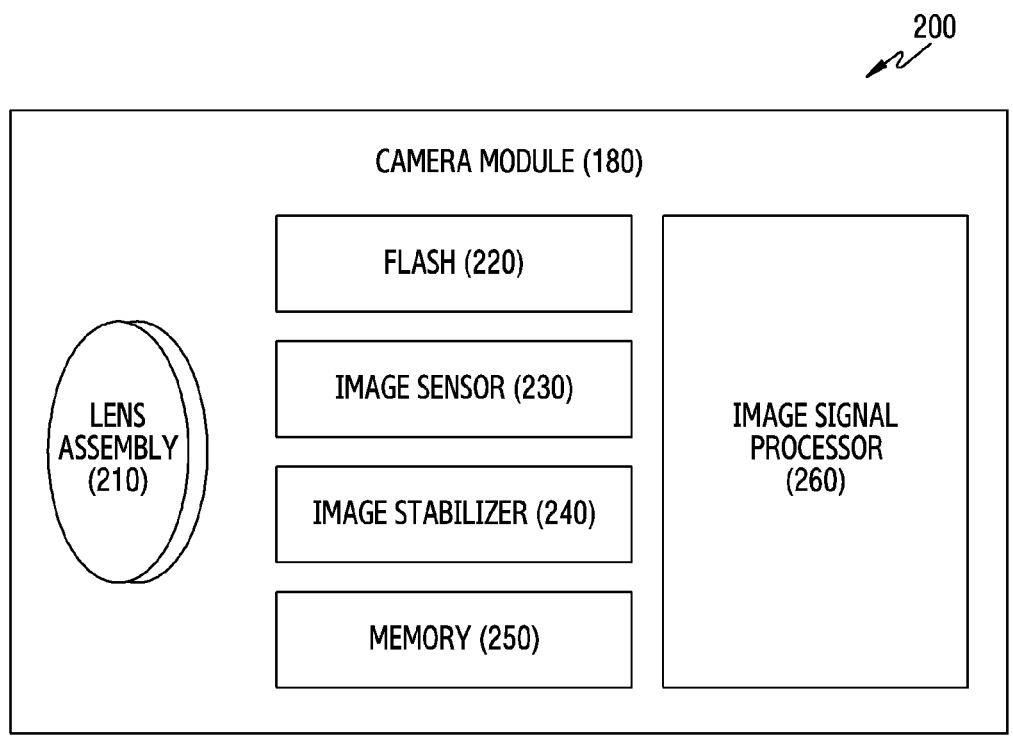
FIG. 2 is a block diagram illustrating a camera module according to various embodiments.

FIG. 2 is a block diagram 200 illustrating a camera module 180 according to various embodiments. Referring to FIG. 2, the camera module 180 may include a lens assembly 210, a flash 220, an image sensor 230, an image stabilizer 240, a memory 250 (e.g., a buffer memory), or an image signal processor 260. The lens assembly 210 may collect light emitted from a subject that is a target of image capturing. The lens assembly 210 may include one or more lenses. According to an embodiment, the camera module 180 may include a plurality of lens assemblies 210. In this case, the camera module 180 may be, for example, a dual camera, a 360-degree camera, or a spherical camera. The plurality of lens assemblies 210 have the same lens properties (e.g., angle of view, focal length, auto focus, f number, or optical zoom), or at least one lens assembly may have at least one other lens properties different from the other lens assemblies. The lens assembly 210 may include, for example, a wide angle lens or a telephoto lens. The flash 220 may emit a light source used to enhance the light emitted from the subject. The flash 220 may include one or more light emitting diodes (e.g., red-green-blue (RGB) LED, white LED, infrared LED, or ultraviolet LED), or xenon lamps.

The image sensor 230 may acquire an image corresponding to the subject by converting light transmitted from the subject through the lens assembly 210 into an electrical signal. According to an embodiment, the image sensor 230 may include one image sensor selected among image sensors having different properties, for example, an RGB sensor, a black and white (BW) sensor, an IR sensor, or a UV sensor, a plurality of image sensors having the same property, or a plurality of image sensors having different properties. Each image sensor included in the image sensor 230 may be implemented as, for example, a charged coupled device (CCD) sensor, or a complementary metal oxide semiconductor (CMOS) sensor.

In response to the movement of the camera module 180 or the electronic device 101 including the same, the image stabilizer 240 may move the at least one lens included in the lens assembly 210 or the image sensor 230 in a specific direction or may control (e.g., adjust read-out timing) the same in order to at least partially compensate for negative effects (e.g., image shaking) caused by the movement with respect to a captured image. According to an embodiment, the image stabilizer 240 may be implemented as, for example, an optical image stabilizer, and may detect the above-mentioned movement using a gyro sensor (not shown) disposed inside or outside the camera module 180 or an acceleration sensor (not shown).

The memory 250 may at least temporarily store at least a portion of the image acquired through the image sensor 230 for the purpose of a next image processing task. For example, if the image acquisition according to a shutter is delayed or if a plurality of images are acquired at a high speed, the acquired original image (e.g., a high-resolution image) may be stored in the memory 250 and a copied image (e.g., a low-resolution image) corresponding to the original image may be previewed through a display device 160. Thereafter, if a designated condition is satisfied (e.g., a user input or a system command), the at least a portion of the original image stored in the memory 250 may be acquired and processed by, for example, the image signal processor 260. According to an embodiment, the memory 250 may be configured as at least a portion of the memory 130 or may be configured as a separate memory operating independently of the memory 130.

The image signal processor 260 may perform image processing (e.g., depth map generation, three-dimensional (3D) modeling, panorama generation, feature point extraction, image composition, or image compensation {e.g., noise reduction, resolution adjustment, brightness adjustment, blurring, sharpening, or softening}) with respect to the image acquired through the image sensor 230 or the image stored in the memory 250. Additionally or alternatively, the image signal processor 260 may perform control (e.g., exposure time control or read-out timing control) on at least one (e.g., the image sensor 230) of the components included in the camera module 180. The image processed by the image signal processor 260 may be stored again in the memory 250 for further processing, or may be transmitted to the external component (e.g., the memory 130, the display device 160, an electronic device 102, an electronic device 104, or a server 108) of the camera module 180. According to an embodiment, the image signal processor 260 may be configured as at least a portion of the processor 120 or may be configured as a separate processor operating independently of the processor 120. When configured as the separate processor, the images processed by the image signal processor 260 may be processed by the processor 120 as is, or may be subjected to additional image processing and then may be displayed through the display device 160.

According to an embodiment, the electronic device 101 may include two or more camera modules 180 each having different attributes or functions. In this case, for example, at least one camera module 180 may be a wide angle camera or a front camera, and at least one the other camera module may be a telephoto camera or a rear camera.

An apparatus or method for displaying surrounding information using augmented reality proposed in the disclosure may acquire information about a point of interest (POI) scattered around a user with respect to a current location in a situation where the user is capturing the surroundings using a camera, and may show the acquired information together with a preview image or screen, captured by the camera and displayed on a display, using an augmented reality technique.

Basic terms required for description below will be defined first.

Point of interest: It means a place that is useful to a user or that may be of interest to the user. Hereinafter, it may be referred to as POI.

Content provider server: It stores a list of all POIs and information on each POI, and can provide a list of POIs around the location of a user and related information by request based on the location of the user. Hereinafter, it may be referred to as a content provider (CP) server.

POI-related information: It includes information describing POIs that is useful to a user or that can lead users to be more interested in. It may include a related image, name (business name), location, category, address, telephone number, etc., of the POI, and may additionally include advertisement or event related information in certain cases. The POI-related image may be an image that may represent the corresponding POI, and may include a business name or an image including a representative product. The category may indicate a type of business to which the POI belongs. The category may be predetermined by a content provider, and to which category each POI belongs may be predetermined. For example, categories of each POI may be determined for each business type such as a cafe, a restaurant, a movie theater, a hotel, etc., or may be further subdivided into a western restaurant, a Korean restaurant, a snack restaurant, and the like.

Figure 3:
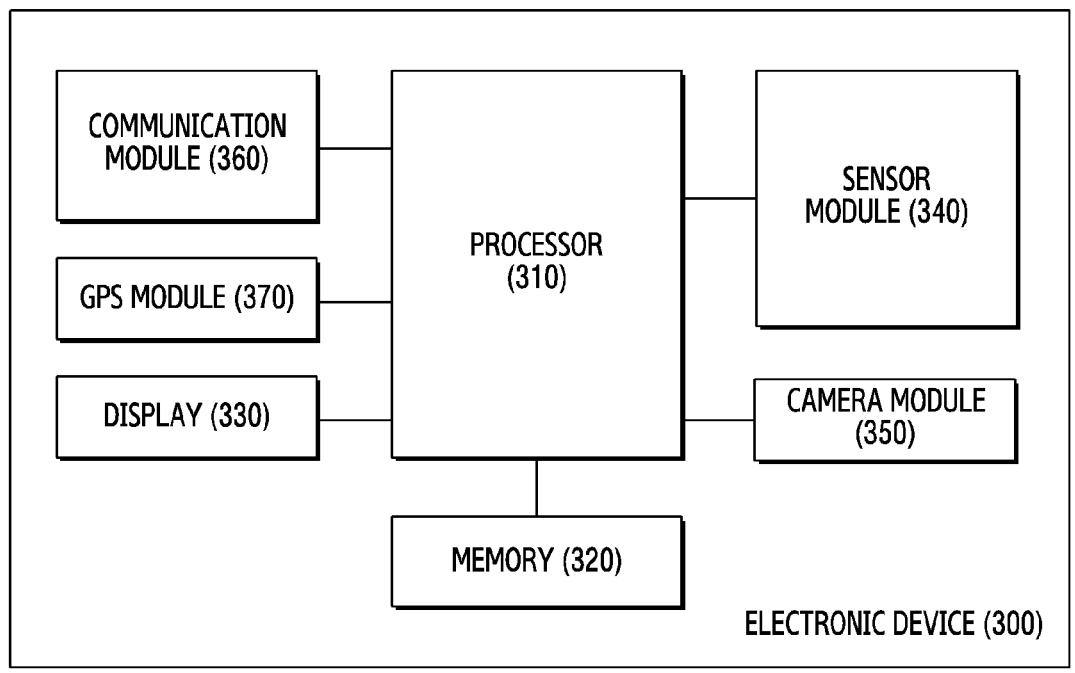
FIG. 3 is a diagram illustrating an example of functional configuration of an electronic device according to various embodiments.

FIG. 3 is a diagram illustrating an example of functional configuration of an electronic device 300 according to various embodiments. FIG. 3 briefly illustrates a functional configuration which may be used for realizing the method proposed in the disclosure. In an embodiment, the electronic device 300 of FIG. 3 may be the electronic device 101 of FIG. 1.

Referring to FIG. 3, the electronic device 300 may include a processor 310, a memory 320, a display 330, a sensor module 340, a communication module 360, and/or a GPS module 370. However, the electronic device 300 is not limited thereto. At least one of the above-mentioned components may be omitted or one or more other components may be added to the electronic device 300.

The camera module 350 may capture the vicinity of a current location. A specific component of the camera module 350 may be the camera module 180 illustrated in FIG. 2. An image or video captured by the camera module 350 may be displayed on the display 330.

The sensor module 340 may include at least one of a geomagnetic sensor, an acceleration sensor (e.g., an accelerometer), a gyro sensor (e.g., a gyroscope), or a six-axis sensor. The sensor module 340 may detect a direction in which the camera module 350 of the electronic device 300 captures based on information obtained using the included sensor. The detected direction may be used for the processor 310 to select surrounding information to be displayed on the display 330. The sensor module 340 may correspond to the sensor module 176 of FIG. 1 or may be a portion thereof.

The communication module 360 may establish a communication link between the electronic device 300 and an external electronic device (e.g., the server 108 of FIG. 1), and may perform communication through the established communication link. For example, the communication module 360 may transmit and receive a control command or data to and from other electronic devices using a communication method such as Bluetooth, BLE, Wi-Fi, NFC, or LTE.

The GPS module 370 may generate location information obtained by detecting the current location of the electronic device 300. The GPS module 370 may receive signals from a GPS satellite to generate information about the current location of the electronic device 300, for example, location information including latitude/longitude.

The communication module 360 may transmit or receive information to and from an external electronic device based on the control of the processor 310. For example, the communication module 360 may transmit the location information generated by the GPS module 370 and direction information obtained by the sensor module 340 to an external electronic device (e.g., the server 108 of FIG. 1), and may acquire surrounding information from the external electronic device.

The display 330 may display information to provide the information to a user. The display 330 may correspond to the display device 160 of FIG. 1. The display 330 may display a preview video captured by the camera module 350 of the electronic device 300 and surrounding information on a screen in the form of augmented reality (AR).

The processor 310 may control overall operations of the electronic device 300. The processor 310 may be organically coupled to the other components (e.g., the memory 320, the display 330, the sensor module 340, the camera module 350, the communication module 360, and the GPS module 370) to control the other components to correctly operate, may provide data for the other components, and may acquire and process data from the other components. The processor 310 may be implemented in software, may be implemented in hardware such as a chip, a circuit, or the like, or may be implemented in a collection of software and hardware. The processor 310 may be one or a collection of a plurality of processors.

The memory 320 may refer to one or more memory sets. The memory 320 may execute instructions stored in the memory 320 based on signaling with the processor 310. The memory 320 may store data and/or commands which are received from the other components (e.g., the processor 120, the sensor module 340, the communication module 360, and the display 330) or generated by the other components.

According to various embodiments, when a user desires to acquire information on surrounding information by starting capturing or executing the related application, the processor 310 may acquire current location information of the user or the electronic device 300 using the GPS module 370, and may transmit the acquired location information to an external electronic device (e.g., the server 108 of FIG. 1) using the communication module 360. The processor 310 may receive point of interest (POI) information around the location of the user or the electronic device 300 from the external electronic device. The processor 310 may calculate and arrange distances and directions to each POI based on the current location of the electronic device 300 using the received POI information. The processor 310 may determine which POI is to be displayed on the screen and which region of the screen the corresponding POI is to be displayed based on the arranged results. The processor 310 may distinguish the POIs into general POIs and focus POIs, may display more detailed information on the focus POI on the screen, and may display the general POIs using icons to provide the information to the user. Further, the focus POIs may be displayed in a focus region designated on the screen of the display 330. According to another embodiment, the processor 310 may distinguish advertisement POIs in addition to the general POIs and the focus POIs. The advertisement POI may be a POI including advertisement or event information in the POI information at the request of an advertiser. As to the advertisement POI, the processor 310 may additionally display advertisement or event information on the screen in addition to information displayed by the general POI or the focus POI.

According to various embodiments, the processor 310 may acquire the current location of the electronic device 300 using the GPS module 370. The processor 310 may request POI list data within a predetermined distance from the current location of the electronic device 300 from a content provider (CP) server (e.g., the server 108 of FIG. 1). The CP server may store POI information to be provided to a user. According to an embodiment, the processor 310 may transmit the current location of the electronic device 300 to the CP server using the communication module 360 to request POI list data from the CP server. In response to the transmitted location information, the processor 310 may receive the POI list data from the CP server through the communication module 360. Information included in the POI list data received from the CP server may include latitude/longitude information indicating the location of each POI, name information, image information including a representative image, contact information, category information, and other text information.

According to various embodiments, the processor 310 may calculate the distance and direction of each POI with respect to the current location of the electronic device 300 based on the location information of the POI list transmitted from the CP server, and may arrange the POIs in order of distance from the current location of the electronic device 300. According to an embodiment, the processor 310 may calculate a distance, an angle, and the like with the latitude/longitude of the current location of the electronic device 300 using the latitude/longitude included in the POI information received from the CP server. The processor 310 may arrange relative location values between the electronic device 300 and the respective POIs using the calculated results.

According to various embodiments, the processor 310 may display information on surrounding POIs together with a preview screen that is a result captured by the camera module 350, on the screen in the form of AI. However, due to conditions such as the amount of surrounding information, the size of the display, the angle of view of the camera in the camera module 350, and the like, positions for displaying multiple POIs may overlap so that it may be difficult to display all the overlapping POIs on one screen of the display 330. Accordingly, the processor 310 may predict positions in which all the POIs are to be displayed in consideration of conditions such as a camera angle of view, a display size, a user interface (UI), etc., and may generate a group of the overlapping POIs. The POI group may refer to a bundle of POIs bound based on a specific criterion. In particular, in a case in which a distance between the POIs is short, since it is difficult to distinguish and display many POIs on the screen due to the space limitation of the screen of the display 330, the processor 310 may group many POIs into a single POI group to display the POI group. According to an embodiment, the processor 310 may define the POI group by grouping the POIs having similar numerical values obtained using a distance between the POIs, a direction of the POI, and the like into the POI group. The processor 310 may display the POI group based on one representative POI, and may allow a user to access information of another POI included in the corresponding POI group by using the representative POI as an interface. The processor 310 may determine the representative POI based on information received from the CP server, or may be determined based on the usage habit and preference of the user. According to an embodiment, the processor 310 may determine the POI which is closest to the current location of the electronic device 300 among the POIs included in the POI group, as the representative POI. According to another embodiment, the processor 310 may determine the POI having the highest grade as the representative POI based on the POI information received from the CP server. According to another embodiment, when a user prefers a restaurant category, the processor 310 may determine the POI included in the corresponding category as the representative POI. The processor 310 may determine representative information and display position for displaying, on the screen, each POI group generated based on a predetermined criterion.

According to various embodiments, the processor 310 may display a preview video captured by the camera module 350 on the screen, and may display the above-described respective POI groups on the screen in the form of AI above the displayed preview video. In order to display each POI group on the screen, the processor 310 may acquire in real-time a direction in which the camera of the electronic device 300 or the camera module 350 captures using the sensor module 340, and may display information of the POI group in consideration of the location and direction of each POI group and the angle of view of the camera. In this case, the information displayed on the screen of the display 330 may be information representing each POI group, and an additional interface with a user may be used to confirm information of another overlapping POI. For example, the processor 310 may display a UI related to the representative POI on the screen, and the corresponding UI may be used as an interface in order for a user to acquire information of another POI included in the same POI group. According to an embodiment, when detecting a left/right scrolling operation of the user, the processor 310 may display the information of the other POI included in the same POI group on the screen of the display 330.

According to various embodiments, the processor 310 may display POI information of the direction in which the camera module 350 captures together with a video captured by the camera module 350 on the screen, thereby simultaneously providing them to the user. Accordingly, in response to the direction in which the camera module 350 is changed as the electronic device 300 rotates to the left or right of the user, the processor 310 may confirm the POI corresponding to the direction to display the same on the screen.

As described above, when the processor 310 displays surrounding information on the screen of the display 330, there may be a trade-off relationship between the UI region where each POI group is displayed and the amount of data to be provided. In order to provide a lot of data to the user, the UI region may be increased, and when the UI region is reduced, limited information can be provided. Accordingly, in the disclosure, the focus POI may be defined so that more detailed information on the POI group that is determined to be important to the user may be provided in the focus region.

Figure 4:
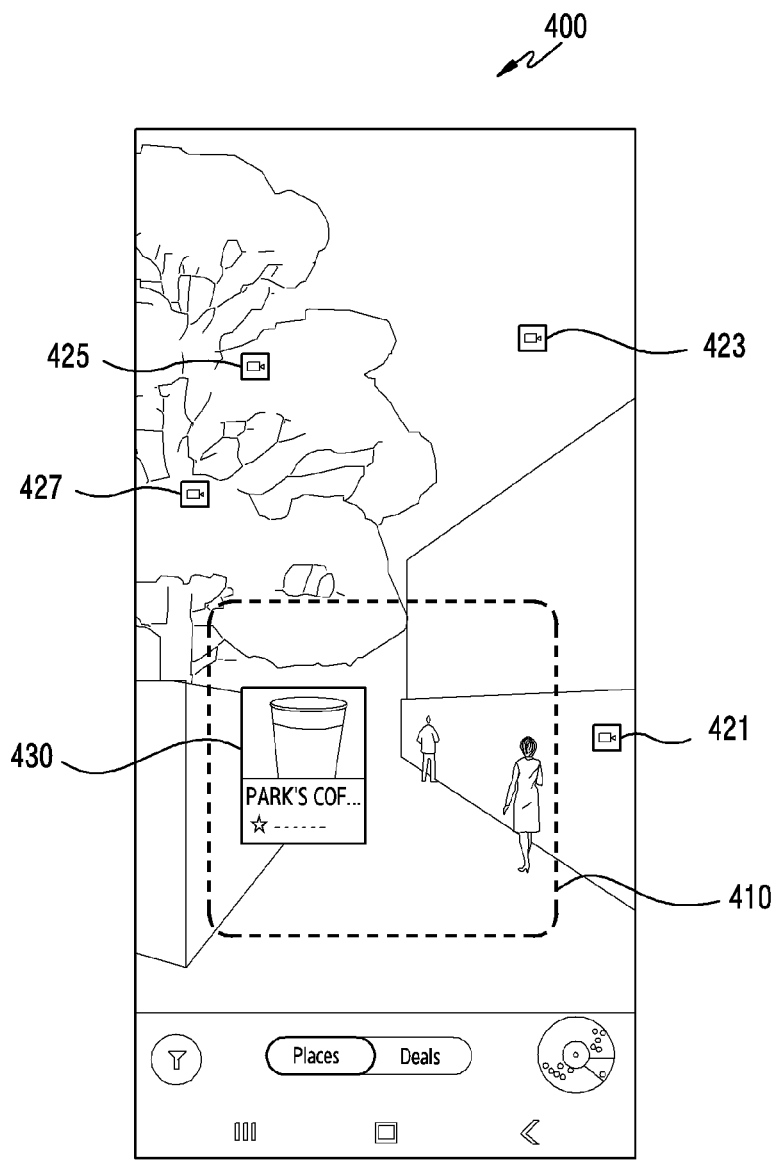
FIG. 4 is a diagram illustrating an example of a focus region designated on a screen of an electronic device according to various embodiments.

FIG. 4 is a diagram 400 illustrating an example of a focus region 410 designated on the screen of the electronic device 300 according to various embodiments.

According to various embodiments, the processor 310 may designate a partial region of the screen of the display 330 as the focus region 410. According to an embodiment, referring to FIG. 4, the lower center portion of the screen of the display 330 may be designated as the focus region 410 as shown in the dotted line box of FIG. 4. The processor 310 may determine a focus POI or a focus POI group to be displayed in the focus region 410 by using the location of the electronic device 300, the capturing direction of the camera module 350, the distance and angle of the POI, and the like.

In response to a change in the location of the electronic device 300 and/or the capturing direction by the manipulation of a user, the focus POI or the focus POI group to be displayed in the focus region may be changed. The processor 310 may cause a general POI or POI group that cannot be displayed in the focus region to provide minimal information using simple UIs 421 to 427, and may cause a focus POI group that can be displayed in the focus region to provide more information to the user by expanding a UI region 430.

According to an embodiment, the processor 310 may display the general POI or the general POI group using icons 421, 423, 425, and 427 indicating the category of the corresponding POI or POI group. In an embodiment, the icon 421 may be an icon obtained by shaping a knife and a fork to represent a western restaurant and indicate a western restaurant category, the icon 425 may be an icon obtained by sharing a projector and indicate a cinema category, and the icon 427 may be an icon obtained by shaping a coffee cup and indicate a cafécategory. According to another embodiment, the processor 310 may display a UI including the image, name, etc., of the corresponding POI or POI group with respect to the focus POI or the focus POI group. As a result, with respect to the focus POI or focus POI group, it is possible to display the UI 430 including more information than that of the general POI or general POI group on the screen of the display 330, and may provide the displayed UI 430 to the user. When displaying the POI group on the screen of the display 330, the processor 310 may display an icon corresponding to the category of a representative POI with respect to the general POI group, and may display the image, name, etc., of the representative POI of the corresponding POI group with respect to the focus POI group.

According to various embodiments, the processor 310 may separate the advertisement POI to display the advertisement or event information in addition to the icon of the general POI, or may allow the advertisement or event information to be additionally included in the UI of the focus POI to display the corresponding information. In addition, when the advertisement POI is included in the POI group, the advertisement POI may be determined as the representative POI in preference to other POIs.

According to various embodiments, the processor 310 may convert the focus POI into the general POI and the general POI into the focus POI by a change in the location and/or capturing direction of the electronic device 300. In order to display such a change on the screen, the processor 310 may gradually change the UI from the UI representing the focus POI to the UI representing the general POI, or conversely, may gradually change the UI from the UI representing the general POI to the UI representing the focus POI.

Figure 5:
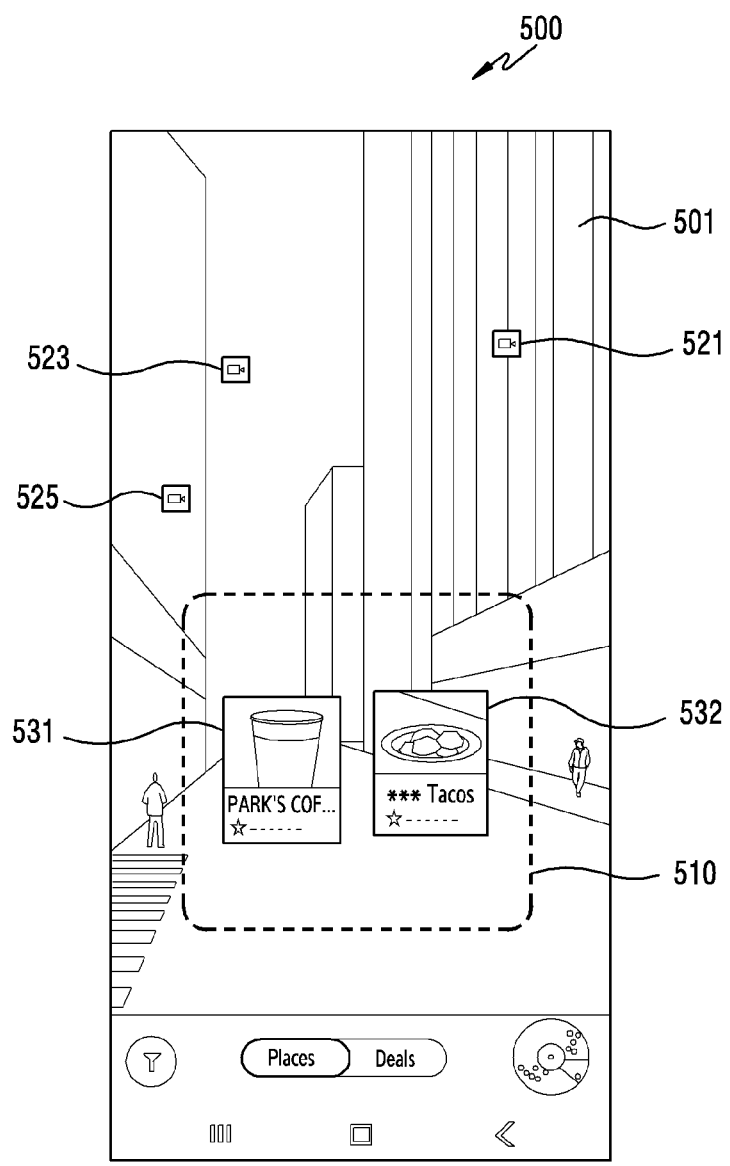
FIG. 5 is a diagram illustrating an example of displaying POI information on a display screen of an electronic device according to various embodiments.

FIG. 5 is a diagram 500 illustrating an example of displaying POI information on the screen of the display 330 of the electronic device 300 according to various embodiments.

Figure 6:
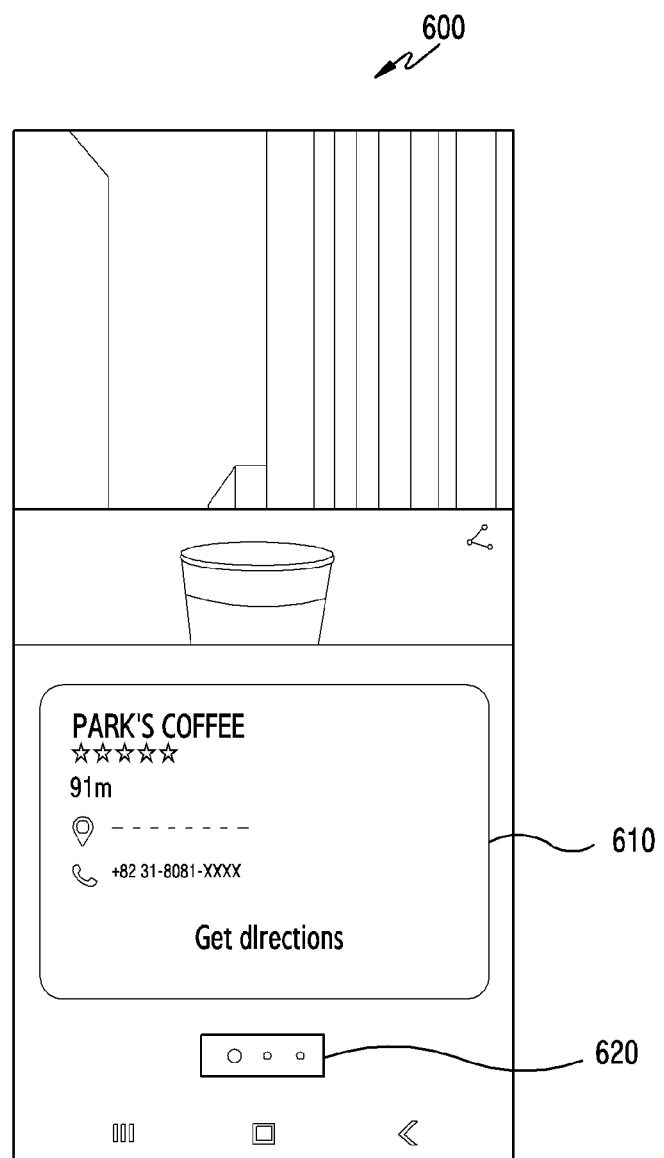
FIG. 6 is a diagram illustrating an example of displaying detailed POI information on a display screen of an electronic device according to various embodiments.

FIG. 6 is a diagram 600 illustrating an example of displaying detailed POI information on the screen of the display 330 of the electronic device 300 according to various embodiments.

Referring to FIG. 5 according to an embodiment, the processor 310 may display a UI including POI information on the screen of the display 330 together with a preview video 501 captured by the camera module 350. UIs 531 and 532 may include information on a focus POI, and the processor 310 may display information such as a representative image, a name, a distance, a star rating, and a rating related to the POI. In particular, the UIs 531 and 532 may be displayed in a focus region 510 of the screen of the display 330. On the other hand, the UIs 521, 523, and 525 may display information of general POIs, and the processor 310 may display corresponding information using an icon indicating the category of the corresponding POI, and the icons may be different icons for each category. According to an embodiment, the advertisement POI may be displayed on the screen, and in the case of the advertisement POI, advertisement information and/or event information may be included in the information displayed on the screen.

When a user touches a UI displayed on the screen of the display 330 regardless of whether the POI is a general POI, a focus POI, or an advertisement POI, the processor 310 may display, on the screen, a UI 610 including detailed information related to the corresponding POI of the touched UE as shown in FIG. 6. The UI 610 may show a variety of information related to a POI received from a CP server to a user, and the detailed information displayed on the UI 610 may be connected to a separate app by a hyperlink or the like to provide an additional service. For example, the UI 610 may display a representative image, a name, a star rating, a rating, a distance, an address, a contact, and the like, and when a contact displayed on the UI 610 is pressed, a caller app (CALL) may be executed to provide a phone call service. When a user touches the representative image or name, an Internet app may be executed to display the website of the corresponding POI. When a user touches the address or "get directions", a service may be provided in conjunction with a map-related app to provide a detailed guidance on the way to a corresponding place. In addition, when the POI touched by the user is a POI group in which a plurality of POIs are grouped instead of a single POI, the processor 310 may display a separate UI 620 on the screen of the display 330 to indicate that the separate UI 620 is the POI group and to provide information related to the number of POIs included in the POI group to a user. In this case, the processor 310 may provide information of another POI other than the currently displayed POI on the screen of the display 330 in response to a left/right sweeping operation of the user.

Figure 7:
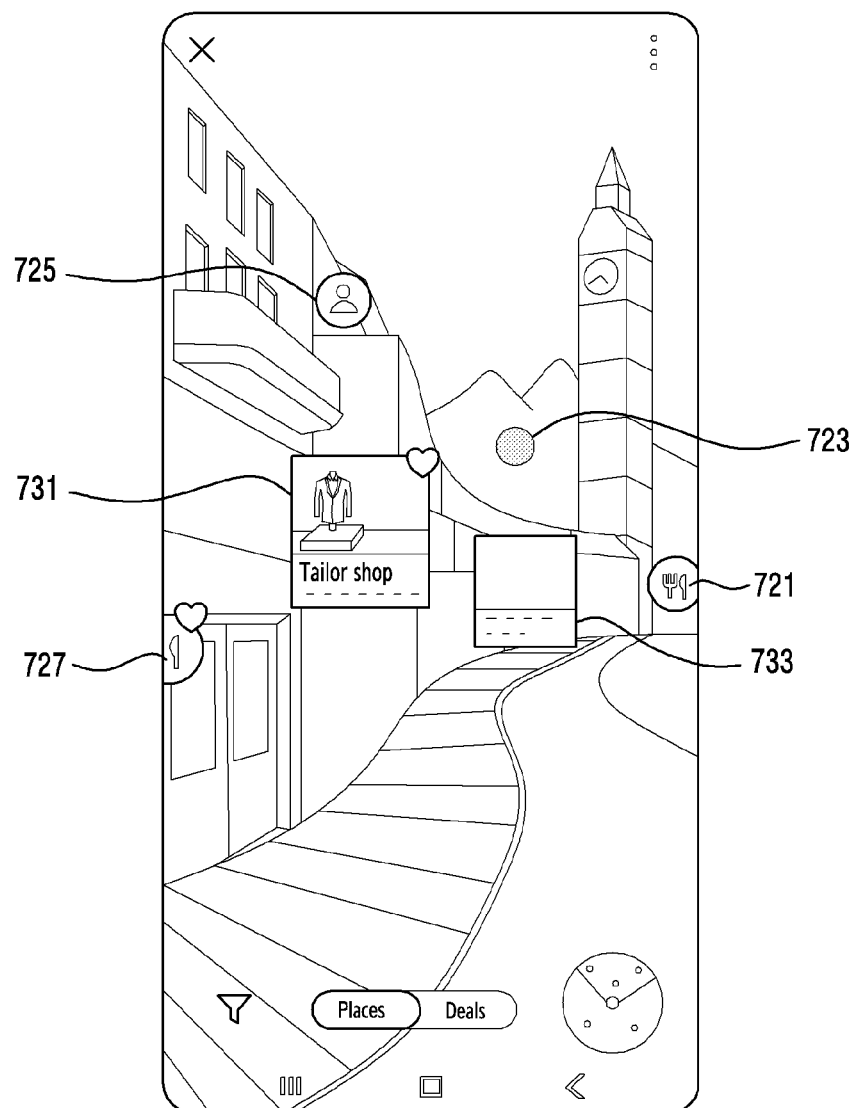
FIG. 7 is a diagram illustrating another example of displaying POI information on a display screen of an electronic device according to various embodiments.

FIG. 7 is a diagram illustrating another example of displaying POI information on the screen of the display 330 of the electronic device 300 according to various embodiments.

Referring to FIG. 7, in a situation where a user uses an application implementing the method of the disclosure, the processor 310 may display POI information on the screen of the display 330 together with a preview captured by the camera module 350, and in the case of a general POI, POI information may be displayed using icons 721, 723, 725, and 727 indicating the category of each POI. According to an embodiment, the icon 721 and the icon 727 may be used to indicate that the corresponding POI is a restaurant category, and the icon 725 may be used to indicate that the corresponding POI is a category for a place where a meeting can be conducted. According to an embodiment, the processor 310 may vary the size of the icon according to the distance from the current location of the electronic device 300, so that a close POIs may be displayed using the icon 727 having a relatively large size and a distant POI may be displayed using the icon 723 having a relatively small size. According to an embodiment, the processor 310 may provide an icon reflecting a user's preference. The processor 310 may display a POI having a high user's preference using a heart shape as shown in the icon 727. For a specific icon, when there is a user's operation such as a touch, detailed information of the POI corresponding to the icon may be provided as shown in FIG. 6. In the case of a focus POI, the processor 310 may display UIs 731 and 733 providing additional information such as the name, star rating, and rating of the POI together with a corresponding image, on the screen of the display 330. Even in the case of the focus POI, the processor 310 may display the focus POI using the relatively large UI 731 when a distance from the electronic device 300 is short and may display the focus POI using the relatively small UI 733 when the distance thereof is large. According to another embodiment, the processor may display the POI having a relatively short distance from the electronic device 300 to be located in a lower portion of the screen, and may display the POI having a relatively long distance therefrom to be located in an upper portion of the screen. According to an embodiment, the processor 310 may provide a UI reflecting a user's preference, and may display the POI having high user's preference using a heart shape as shown in the UI 731. In addition, in the case of advertisement POI, the processor 310 may display, on the screen of the display 330, a UI (not shown) that provides information such as advertisement information or event information in addition to information such as a name, a star rating, and a rating of the POI together with a corresponding image. According to an embodiment, the advertisement POI may be displayed more significantly than the general POI and the focus POI so that the user can be more aware of the advertisement POI. According to an embodiment, the advertisement POI may be included in the general POI or may be included in the focus POI.

According to various embodiments, the processor 310 may configure a specific region of a preview screen generated by the camera module 350 as the focus region, and may configure POIs existing in the focus region as the focus POI. When the processor 310 compares the location, direction information, road conditions, road conditions, etc., between the electronic device 300 and the POI, the processor 310 may configure a place to which is more accessible by the user as the focus region, and may configure the POI existing in the corresponding focus region as the focus POI, thereby providing relatively a variety of information.

According to various embodiments, the processor 310 may select the focus POI based on various criteria. According to an embodiment, as described above, the processor 310 may select all the POIs within the easily accessible focus region as the focus POIs. In another embodiment, the processor 310 may select the focus POI based on a direction in which the camera module 350 captures, an angle of view of the camera, a distance between the current location of the electronic device 300 and the POI, and the like. Accordingly, an actual location may be included in a preview screen determined based on the direction in which the camera module 350 captures and the angle of view among the surrounding POIs so that the POI having a distance within a predetermined value may be selected as the focus POI. According to another embodiment, the processor 310 may select a POI where the user has previously visited or a POI on which the user has previously searched for information, as the focus POI. In another embodiment, the processor 310 may select the focus POI based on a user's past usage history, behavior, and the like. In another embodiment, the processor 310 may select the focus POI based on a preference preset by the user. For example, in the case of a restaurant having the highest preference of the user, the processor 310 may select a restaurant-related POI as the focus POI. In another embodiment, the processor 310 may select the focus POI based on a combination of the above-described respective selection conditions.

According to various embodiments, for the POIs included in the focus POI, the processor 310 may vary the level of information provided for each POI based on the past usage history, the behavior, and the like.

According to various embodiments, when changing the location of the electronic device 300 by the user, the processor 310 is used to newly change the distance and angle with all the POIs, and accordingly, the selection of the focus POI may be renewed and the POI group may be added, deleted, or changed. In addition, even when the direction in which the camera module 350 captures is changed by the user, the processor 310 may need to renew the selection of the focus POI. According to an embodiment, when the direction in which the camera module 350 captures is changed, the processor 310 may display, on the screen of the display 330, the focus POI included in a preview video currently captured by the camera module 350 and displayed among the previously selected focus POIs, without selecting a new focus POI.

According to various embodiments, the processor 310 may newly select the focus POI by receiving new POI information from the CP server according to the degree of change in the location of the electronic device 300, and may display the selected focus POI on the screen of the display 330.

By the above-described operations of the processor 310, according to the disclosure, rather than providing information about a place through a fixed map image, location information may be rendered on a video captured by the user to make it easier to find the location information, and a variety of information related to the corresponding place in addition to a simple location may be provided to the user.

According to various embodiments, an electronic device (e.g., the electronic device 101 of FIG. 1 or the electronic device 300 of FIG. 3) may include: a communication module configured to perform communication with an external device; a camera module configured to capture a video; at least one processor configured to be operatively connected to the communication module and the camera module; and at least one memory configured to be operatively connected to the at least one processor, wherein the at least one memory stores, when executed, instructions for causing the at least one processor to acquire a preview video captured by the camera module by controlling the camera module, to acquire location information of the electronic device, to acquire information on at least one point of interest (POI) located in the vicinity based on the location information, to select a focus POI among at least one POI based on information on the at least one POI, to determine first information to be provided to a user for general POIs including the remaining POIs except the selected focus POI among the at least one POI, to determine second information to be provided to the user for the focus POI, wherein the second information includes more information than the first information, to determine a location on a screen on which the preview video in which the information on the at least one POI is to be displayed is provided, and to display to provide the first information or the second information on the location on the screen on which the determined preview video of all or some of the at least one POI is provided.

According to various embodiments, the instructions may cause the at least one processor to select a POI including advertisement and/or event information in the information on the at least one POI among the at least one POI as an advertisement POI, to determine third information to be provided to the user for the advertisement POI, wherein the third information includes the advertisement and/or event information, and to display to provide the third information on the location on the screen on which the determined preview video is provided for the advertisement POI.

According to various embodiments, the instructions may cause the at least one processor to select the some POIs to be displayed on the screen on which the preview video is provided among the at least one POI based on a direction in which the camera module captures the preview video and an angle of view of the camera module, and to display to provide the first information or the second information on the location on the screen on which the determined preview video of each POI of the selected some POIs is provided.

According to various embodiments, the instructions may cause the at least one processor to configure a condition corresponding to the focus POI, and to select a POI in which the information on the at least one POI satisfies the condition corresponding to the focus POI as the focus POI.

According to various embodiments, the instructions may cause the at least one processor to configure a partial region in the preview video as the focus region, and to configure a POI of which actual location is included in the focus region as the condition corresponding to the focus POI.

According to various embodiments, the instructions may cause the at least one processor to determine a distance between the electronic device and each POI based on the location information of the electronic device and location information of each POI included in the information on the at least one POI as the condition corresponding to the focus POI, and to configure a POI in which the distance between the electronic device and the POI is within a predetermined value based on the determined distance between the electronic device and each POI.

According to various embodiments, the instructions may cause the at least one processor to configure a POI having a high preference based on a user's preference configured based on a user's behavior including a POI where the user has previously visited or a POI on which the user has previously searched for information, as the condition corresponding to the focus POI.

According to various embodiments, the instructions may cause the at least one processor to designate a portion on the screen on which the preview video is provided as the focus region, and to display to provide the second information for the focus POI within the focus region.

According to various embodiments, the instructions may cause the at least one processor to configure POIs whose distances between each other are within a predetermined distance as a POI group based on the location information of each POI included in the information on the at least one POI or a location on a screen on which the information on the at least one POI is to be displayed, to select a representative POI among the POIs within the POI group, and to display to provide information on the representative POI to the location on the screen of the representative POI on behalf of the POI group.

According to various embodiments, the instructions may cause the at least one processor to determine the first information to be a category of the POI, to determine the second information to include at least one of a POI-related image, a name, and a distance from a current location of the electronic device, to display an icon corresponding to the category to provide the first information, and to display a user interface (UI) including the second information to provide the second information.

Hereinafter, a method of providing surrounding information on a camera preview video in the form of augmented reality in the electronic device 300 will be described.

Figure 8:
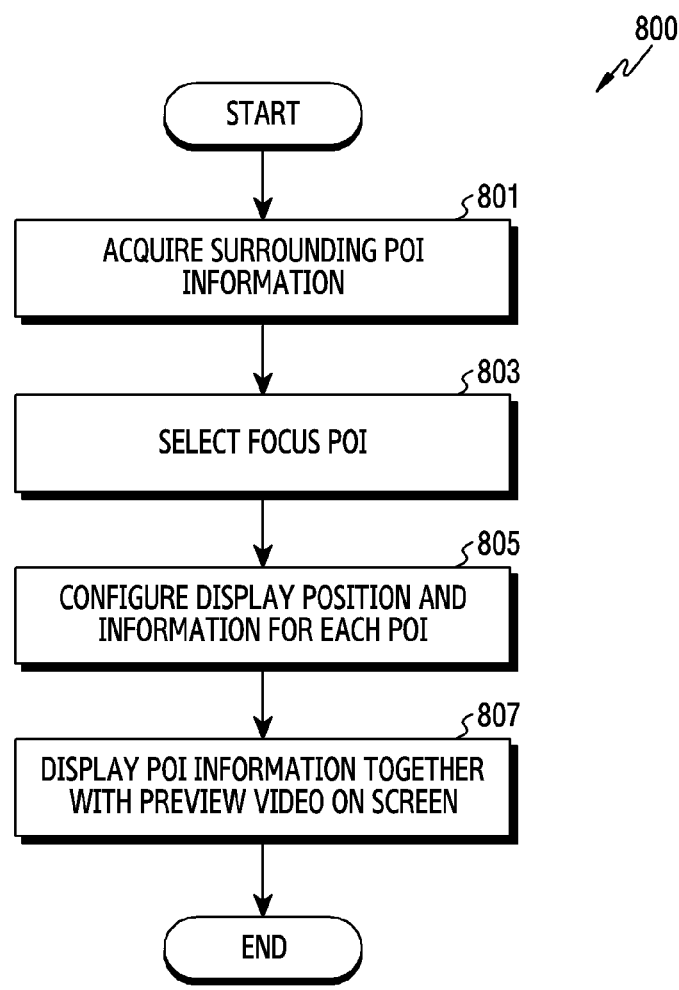
FIG. 8 is a flowchart illustrating an operation of displaying surrounding information of an electronic device according to various embodiments on a display screen.

FIG. 8 is a flowchart 800 illustrating an operation of displaying surrounding information of an electronic device according to various embodiments on a display screen. The operation subject of the flowchart 800 illustrated in FIG. 8 may be understood as an electronic device (e.g., the electronic device 101 of FIG. 1 or the electronic device 300 of FIG. 3) or a processor of the electronic device (e.g., the processor 120 of FIG. 1 or the processor 310 of FIG. 3).

According to various embodiments, in operation 801, the electronic device 101 or 300 may acquire surrounding POI information. In order to acquire the surrounding POI information, when a user starts to capture using the camera module 350 or obtains information on a surrounding location by executing a related application, the electronic device 101 or 300 may acquire current location information of the electronic device 101 or 300 using a GPS module 370. The current location may be displayed in latitude and longitude. The electronic device 101 or 300 may acquire surrounding POI information based on its current location. In an embodiment, the electronic device 101 or 300 may select POIs within a predetermined distance from the current location of the electronic device 101 or 103 among POIs stored in the memory 130 or 320 by an application, thereby acquiring the surrounding POI information. According to another embodiment, the electronic device 101 or 300 may transmit its current location to a CP server (e.g., the server 108 of FIG. 1), and may receive surrounding POI information extracted based on the current location from the CP server, thereby acquiring the surrounding POI information. In this case, the CP server may provide information of POIs within a predetermined distance from the current location of the electronic devices 101 and 300. The POI information may include latitude and longitude information indicating the location of each POI, a name, image information including a representative image, contact information, category information, other text information, and the like.

According to various embodiments, in operation 803, the electronic device 101 or 300 may select a focus POI based on the acquired surrounding POI information. Also, the electronic device 101 or 300 may additionally select an advertisement POI. The focus POI may be a POI determined to be more interested by the user than the general POI. The advertisement POI may be a POI including advertisement and/or event information. According to an embodiment, the electronic device 101 or 300 may select a POI including advertisement and/or event information as the advertisement POI based on the acquired POI information. The advertisement POI may be selected to be distinguished from the general POI or the focus POI, but may be the general POI or the focus POI and the advertisement POI.

According to various embodiments, the electronic device 101 or 300 may select the focus POI based on various criteria. According to an embodiment, the electronic device 101 or 300 may configure the focus region near a place that is easily accessible by a user, and may select all the POIs in the focus region as the focus POIs. In another embodiment, the electronic device 101 or 300 may select the focus POI based on a direction in which the camera module 350 captures, a distance to the POI, an angle of view of the camera, and the like. In another embodiment, the electronic device 101 or 300 may select a POI where the user has previously visited or a POI on which the user has previously searched for information, as the focus POI. According to another embodiment, the electronic device 101 or 300 may select the focus POI based on a user's past usage history, behavior, and the like. According to another embodiment, the electronic device 101 or 300 may select the focus POI based on a preference preset by the user. For example, in the case of a restaurant having the highest preference of the user, the electronic device 101 or 300 may select a restaurant-related POI as the focus POI. In another embodiment, the electronic device 101 or 300 may select the focus POI based on a combination of the above-described respective selection conditions.

According to various embodiments, the electronic device 101 or 300 may arrange the surrounding POIs obtained for selecting the focus POI according to the above-described conditions. In one embodiment, when the focus POI is selected according to the distance, a distance between the current location of the electronic device 101 or 300 and each POI may be obtained based on the location information of the surrounding POIs, and the surrounding POIs may be arranged according to the distance and the surrounding POIs within a predetermined distance may be selected as the focus POIs.

According to various embodiment, when the location of the electronic device 101 or 300 is changed, the electronic device 101 or 300 may newly select the focus POI. According to an embodiment, when the location of the electronic device 101 or 300 is changed, the distance to each POI and the angle may be newly calculated and acquired. Accordingly, since the POI corresponding to the focus POI may be changed, the POI corresponding to the focus POI may be newly selected.

According to various embodiments, when the capturing direction of the electronic device 101 or 300 is changed, the focus POI may be newly selected. When the capturing direction of the electronic device 101 or 300 is changed, POIs that may be displayed on a preview screen by capturing may be changed. Accordingly, the focus POI may be newly selected among the POIs included in a current preview screen. When the capturing direction of the electronic device 101 or 300 is changed, a specific POI may be changed from the focus POI to the general POI or from the general POI to the focus POI.

According to various embodiments, in operation 805, the electronic device 101 or 300 may configure a display position and information for each POI to be displayed on the screen of a display (e.g., the display device 160 of FIG. 1 or the display 330 of FIG. 3). In an embodiment, the display position for each POI may be a position corresponding to an actual position in a preview video captured by the camera module 350 and displayed on the screen. According to another embodiment, a partial region of the screen on which the preview video is displayed may be configured as the focus region, the focus POI may be displayed in the focus region, and the general POI may be displayed outside the focus region. In addition, the electronic device 101 or 300 may configure the display position to be closer to the bottom of the screen with respect to a POI close to the current location of the electronic device 101 or 300, and may configure the display position to be biased toward the top of the screen with respect to a POI far from the current location of the electronic device 101 or 300.

According to various embodiments, the electronic device 101 or 300 may configure different information provided for the general POI and the focus POI. According to an embodiment, the electronic device 101 or 300 may configure the information provided for the general POI using the category of the corresponding POI. On the other hand, the electronic device 101 or 300 may configure more information provided for the focus POI than the general POI. According to an embodiment, the electronic device 101 or 300 may configure the focus POI as information that provides at least one of a related image, name, distance, star rating, and rating. In addition, according to another embodiment, the electronic device 101 or 300 may differently configure information provided for each focus POI based on the past usage history, behavior, and the like even with respect to the focus POI.

According to various embodiments, the display positions of a plurality of POIs may overlap due to conditions such as the amount of the surrounding POI information, the size of the display screen, the angle of view of the camera, and the like, so that it is difficult to simultaneously show all the overlapping POIs on one screen. Accordingly, the electronic device 101 or 300 may configure the display positions of all surrounding POIs as described above in consideration of conditions such as the angle of view of the camera, the size of the display, a user interface (UI), and the like, and may group the POIs whose display positions overlap to generate a POI group. The POI group may refer to a bundle of POIs bound by a specific criterion. In particular, in a case in which a distance between the POIs is short, since it is difficult to distinguish and display many POIs on the screen due to the space limitation of the screen of the display, the electronic device 101 or 300 may group many POIs into a single POI group to display the POI group. According to an embodiment, the electronic device 101 or 300 may define the POI group by grouping the POIs having similar numerical values obtained using a distance between the POIs, an angle, and the like into the POI group. The electronic device 101 or 300 may configure the display position of the POI group based on one representative POI, and may allow the user to access information of other POIs included in the POI group by using the representative POI as an interface. The electronic device 101 or 300 may determine the representative POI based on the POI information acquired in operation 801 or may be determined based on a user's usage habit, preference, or the like. According to an embodiment, the electronic device 101 or 300 may determine a POI closest to the current location of the electronic device 300 as the representative POI among the POIs included in the POI group. According to another embodiment, the electronic device 101 or 300 may determine a POI having the highest rating as the representative POI based on the acquired surrounding POI information. In another embodiment, when the user prefers a restaurant category, the electronic device 101 or 300 may determine a POI included in the category as the representative POI. The electronic device 101 or 300 may configure the representative information and display position for displaying each POI group generated based on a predetermined criterion on the screen, as the information and display position of the representative POI.

According to various embodiments, in operation 807, the electronic device 101 or 300 may display POI information along with the preview video captured by the camera module 350 on the screen. According to an embodiment, the electronic device 101 or 300 may display the display position and information for each POI or group POI configured in operation 805 together on the preview video. According to an embodiment, in the case of the general POI, the electronic device 101 or 300 may display the POI information by displaying an icon corresponding to the category of the POI at the display position determined in operation 805. In addition, in the case of the focus POI, the electronic device 101 or 300 may display a UI including information (e.g., at least one of an image, a name, a location, a star rating, and a rating) configured at the display position determined in operation 805. According to another embodiment, in the case of the general POI group, the electronic device 101 or 300 may display an icon corresponding to the category of the representative POI at the display position determined in operation 805 for the representative POI. In addition, in the case of the focus POI group, the electronic device 101 or 330 may display a UI including information configured for the representative POI at the display position determined in operation 805 for the representative POI. In the case of the focus POI or the focus POI group, the display position may be within the focus region of the screen. In addition, in the case of the advertisement POI, the electronic device 101 or 300 may display a UI including information configured at the display position determined in operation 805. The configured information of the advertisement POI may necessarily include advertisement and/or event information.

According to various embodiments, the electronic device 101 or 300 may display a UI including information related to the representative POI on the screen, and information of other POIs included in the same POI group may be provided through an additional interface with the user. According to an embodiment, when the electronic device 101 or 300 detects a left/right scrolling operation of the user, the electronic device 101 or 300 may display the information of the other POIs in the same POI group on the screen of the display 330.

According to various embodiments, the electronic device 101 or 300 may differently configure the size of the UI displayed for each POI or POI group. According to an embodiment, the electronic device 101 or 300 may vary the size of the icon or the UI according to a distance from the current location of the electronic device 101 or 300 may display the corresponding information. The electronic device 101 or 300 may display a close POI using an icon or UI having a relatively large size and may display a distant POI using an icon or UI having a relatively small size.

According to various embodiments, the electronic device 101 or 300 may gradually change the UI to indicate that the POI changing from the general POI to the focus POI or the POI changing from the focus POI to the general POI is changed according to a change in the capturing direction. In one embodiment, when the change from the general POI to the focus POI occurs, the icon may be changed to a UI including information of the corresponding POI while gradually expanded. In another embodiment, when the change from the focus POI to the general POI occurs, a UI including information of the corresponding POI may be finally changed to an icon while gradually reduced.

Figure 9:
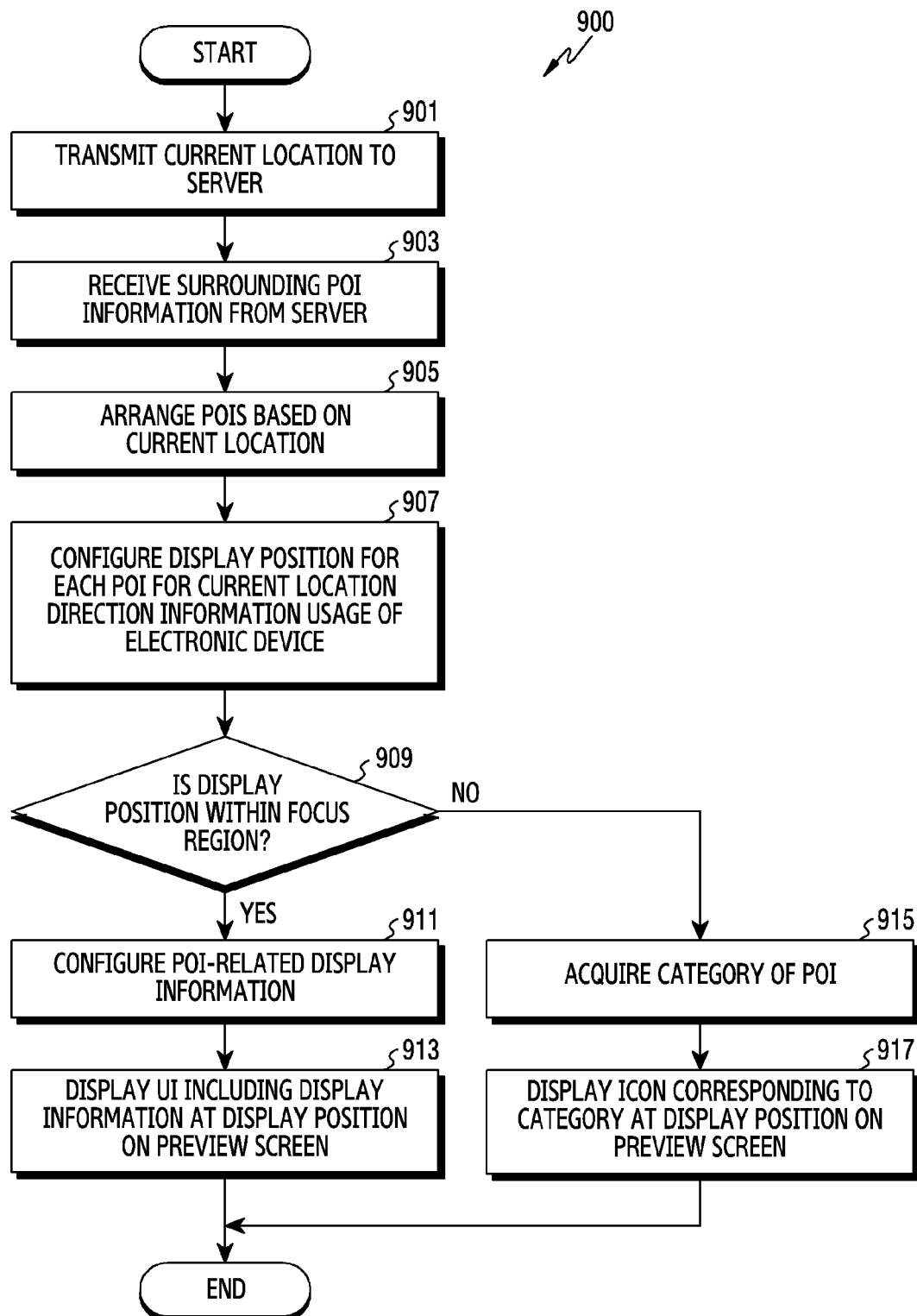
FIG. 9 is a flowchart illustrating another example of an operation of displaying surrounding information of an electronic device according to various embodiments on a display screen.

FIG. 9 is a flowchart 900 illustrating another example of an operation of displaying surrounding information of an electronic device according to various embodiments on a display screen. The operation subject of the flowchart 900 illustrated in FIG. 9 may be understood as an electronic device (e.g., the electronic device 101 of FIG. 1 or the electronic device 300 of FIG. 3) or a processor of the electronic device (e.g., the processor 120 of FIG. 1 or the processor 310 of FIG. 3).

Figure 10:
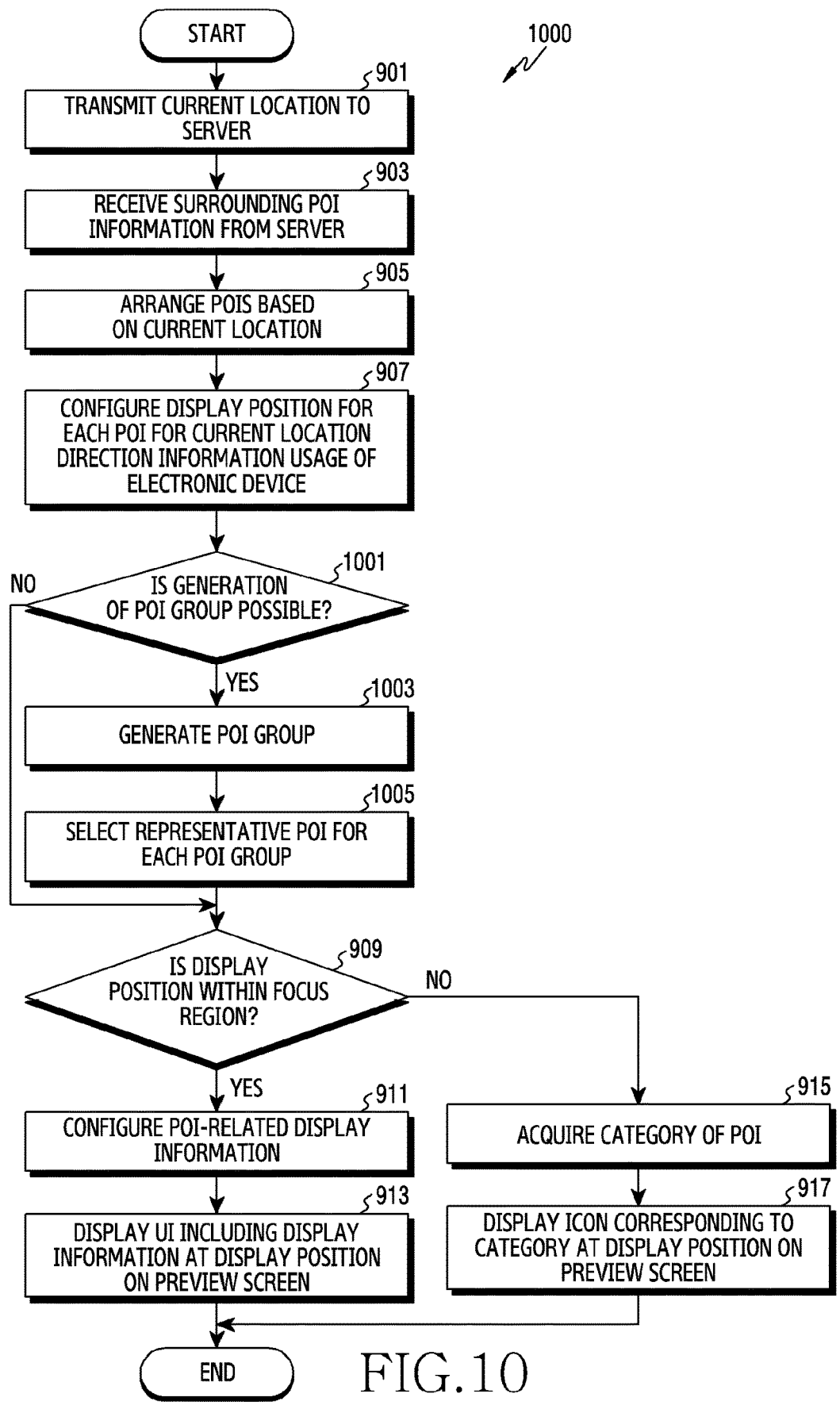
FIG. 10 is a flowchart illustrating an example of an operation of displaying surrounding information of an electronic device on a display screen in consideration of a POI group according to various embodiments.

According to various embodiments, in operation 901, the electronic device may transmit its current location to a CP server (e.g., the server 108 of FIG. 10. When a user desires to obtain information on a nearby location by starting to capture or drive an application provided in the electronic device, the electronic device may acquire its current location using a GPS module (e.g., the GPS module 370 of FIG. 3) and may transmit the acquired current location to the CP server.

According to various embodiments, in operation 903, the electronic device may receive surrounding POI information from the CP server. The surrounding POI may refer to a POI within a predetermined distance from the current location of the electronic device. In an embodiment, the predetermined distance may be configured in the CP server. In another embodiment, the predetermined distance may be configured in the electronic device. When transmitting the current location to the CP server, the electronic device may transmit the predetermined distance, which is configured in advance, together. In this case, the predetermined distance may be configured by receiving an input from the user.

According to various embodiments, in operation 905, the surrounding POIs received from the CP server based on the current location of the electronic device may be arranged. The electronic device may acquire a distance and a direction of each POI based on location information of a POI list received from the CP server, with respect to the current location of the electronic device, and may arrange the respective POIs in order of distance.

According to various embodiments, in operation 907, the electronic device may configure the display position of each POI based on the current location of the electronic device, a direction in which a preview video is captured, and the acquired distance and direction of each POI. In an embodiment, the electronic device my configure the display portion for the POI in which the actual position is included in the preview video. The electronic device may not configure the display position in the preview video for some POIs in which the actual position is not included in the preview video by comparing the direction in which the preview video is captured with the acquired direction of the POI.

According to various embodiments, in operation 909, the electronic device may determine whether the display position of each POI is inside the focus region.

According to an embodiment, the focus region may be arbitrarily designated by the electronic device or may be designated based on a user input. In the embodiment of FIG. 4, the center lower portion of the screen may be designated as the focus region. The electronic device may distinguish the POI into the focus POI and the general POI. Additionally, advertising POIs may be distinguished. The focus POIs may be POIs determined to be more interested by the user than the general POIs. The advertisement POI may be a POI including advertisement and/or event information. Accordingly, the electronic device may select the POI including the advertisement and/or event information as the advertisement POI. A variety of conditions for selecting the focus POI may be provided. The focus POI may configure the display position within a designated focus region of the screen.

According to various embodiments, if the display position of the POI is within the focus region based on the determination in operation 909, information to be displayed in relation to the corresponding POI may be configured in operation 911. In one embodiment, the corresponding POI may be configured as information for displaying at least one of a POI-related image, distance, name, star rating, and rating, but is not limited thereto. If the corresponding POI includes the advertisement and/or event information, that is, the advertisement POI, the advertisement and/or event information may be configured as information to be necessarily displayed. In operation 913, a UI including the information to be displayed, which is configured in operation 911, may be displayed at the display position determined in operation 907 on the preview screen captured by the camera.

According to various embodiments, if the display position of the POI is out of the focus region based on the determination in operation 909, in operation 915, a category of the POI may be acquired, and in operation 917, an icon corresponding to the category of the POI acquired in operation 915 may be displayed at the display position determined in operation 907 on the preview screen captured by the camera.

When displaying the POI information of the electronic device by the above-described operations 911 to 917, the electronic device should consider the capturing direction of a camera (e.g., the camera module 350 of FIG. 3) and the angle of view of the camera currently being captured. In an embodiment, in operation 905, the direction of each POI may be indicated in an absolute orientation. With respect to the current location of the electronic device, the direction of the POI present on the straight north side may be configured as 0 degrees, the direction of the POI on the straight east side may be configured as 90 degrees, the direction of the POI on the straight south side may be configured as 180 degrees, and the direction of the POI on the straight west side may be configured as 270 degrees. In addition, if the capturing direction of the camera is on the straight south side and the angle of view of the camera is 60 degrees, the POIs whose directions are within 150 degrees to 210 degrees may be located and displayed within the preview video being captured by the camera. Since other POI directions are outside the preview video, POIs having the other POI directions may not be displayed on the screen.

FIG. 10 is a flowchart 1000 illustrating an example of an operation of displaying surrounding information of an electronic device on a display screen in consideration of a POI group according to various embodiments. The operation subject of the flowchart 1000 illustrated in FIG. 10 may be understood as an electronic device (e.g., the electronic device 101 of FIG. 1 or the electronic device 300 of FIG. 3) or a processor of the electronic device (e.g., the processor 120 of FIG. 1 or the processor 310 of FIG. 3).

In the flowchart of FIG. 10, operations 901 to 917 may operate in the same manner as the flowchart description of FIG. 9, but after operation 907, an operation of generating a POI group may be added.

A POI group may refer to a bundle of POIs bound by a specific criterion. In an embodiment, POIs having almost identical display positions on the screen among POIs belonging to the focus POI may be configured as one POI group. In particular, in a case in which a distance between the POIs is short, since it is difficult to distinguish and display many POIs on the screen due to the screen space limitation, many POIs may be grouped into a single POI group to display the POI group. In an embodiment, POIs having similar values may be bundled into POI groups using a distance and direction between the POIs. The POI group may be displayed on the screen based on the representative POI when displaying the POI group according to operations 911 to 917.

According to various embodiments, in operation 1001, the electronic device may determine whether the POI group can be generated. In one embodiment, whether the POI group can be generated may be determined by configuring a POI group generation condition and determining whether there are POIs that satisfy the generation condition. For example, POIs within a distance of 2 m between POIs may be generated as a POI group. In another embodiment, POIs in the same building may be generated as a POI group.

If the POI group cannot be generated, operation 909 may be immediately performed. If the POI group can be generated, in operation 1003, the POI group may be generated by grouping the POIs satisfying the above-described conditions.

According to various embodiments, a representative POI for each POI group may be selected in operation 1005. The representative POI may be determined based on each piece of POI information included in the POI group or based on a user's usage habits and preferences. According to an embodiment, the electronic device may select a POI closest to its current location as the representative POI. According to another embodiment, the electronic device may configure the POI having the highest rating among the POIs of the category having the highest preference as the representative POI.

In addition, operations 909 to 917 may be performed based on information of the representative POI of the POI group.

According to various embodiments, in operation 909 of FIG. 10, the electronic device may determine whether the display position of the representative POI of each POI group is within the focus region.

According to various embodiments, if the display position of the representative POI of the POI group is within the focus region based on the determination of operation 909, in operation 911, information to be displayed in relation to the representative POI may be configured. In an embodiment, at least one of the representative POI-related image, distance, name, star rating, and rating may be configured as the information to be displayed, but is not limited thereto. In operation 913, a UI including the information to be displayed with respect to the representative POI configured in operation 911 may be displayed at the display position of the representative POI determined in operation 907 on the preview screen captured by the camera.

According to various embodiments, if the display position of the representative POI is out of the focus region based on the determination in operation 909, in operation 915, the category of the corresponding representative POI may be acquired, and in operation 917, an icon corresponding to the category of the POI acquired in operation 915 at the display position of the representative POI determined in operation 907 on the preview screen captured by the camera.

According to various embodiments of the disclosure by using the above-described method or an application for realizing the above-described method, it is possible to provide location information to make it easier to find the location information by displaying place information on the screen captured by a user. In addition, according to the method, it is possible to provide additional information for selection when a user wants to select one among various places by providing information related to the corresponding place in addition to the simple location.

According to various embodiments, an operation method of an electronic device (e.g., the electronic device 101 of FIG. 1 or the electronic device 300 of FIG. 3) may include: acquiring a preview video captured by a camera module (e.g., the camera module 350 of FIG. 3); acquiring location information of the electronic device; acquiring information on at least one POI located in the vicinity based on the location information; selecting a focus POI among at least one POI based on information on the at least one POI; determining first information to be provided to a user for general POIs including the remaining POIs except the selected focus POI among the at least one POI; determining second information including more information than the first information to be provided to the user for the focus POI; determining a location on a screen on which the preview video in which the information on the at least one POI is to be displayed is provided; and displaying to provide the first information or the second information on the location on the screen on which the determined preview video of all or some of the at least one POI is provided.

According to various embodiments, the method may further include: selecting a POI including advertisement and/or event information in the information on the at least one POI among the at least one POI as an advertisement POI; determining third information to be provided to the user for the advertisement POI, wherein the third information includes the advertisement and/or event information; and displaying to provide the third information on the location on the screen on which the determined preview video is provided for the advertisement POI.

According to various embodiments, the displaying to provide the first information or the second information may include: selecting the some POIs to be displayed on the screen on which the preview video is provided among the at least one POI based on a direction in which the camera module photographs the preview video and an angle of view of the camera module; and displaying to provide the first information or the second information on the location on the screen on which the determined preview video of each POI of the selected some POIs is provided.

According to various embodiments, the selecting of the focus POI among at least one POI may include: configuring a partial region in the preview video as the focus region; and configuring a POI of which actual location is included in the focus region as the focus POI.

According to various embodiments, the selecting of the focus POI among at least one POI may include: determining a distance between the electronic device and each POI based on the location information of the electronic device and location information of each POI included in the information on the at least one POI; and selecting a POI in which the distance between the electronic device and the POI is within a predetermined value as the focus POI based on the determined distance between the electronic device and each POI.

According to various embodiments, the determining of the location on the screen may include: designating a portion on the screen on which the preview video is provided as the focus region; and determining the location within the designated focus region using the location on the screen on which the preview video in which the information on the focus POI is to be displayed is provided.

According to various embodiments, the method may further include: configuring POIs whose distances between each other are within a predetermined distance as a POI group based on the location information of each POI included in the information on the at least one POI or a location on a screen on which the information on the at least one POI is to be displayed; and selecting a representative POI among the POIs within the POI group, wherein the displaying to provide the first information or the second information includes displaying to provide information on the representative POI to the location on the screen on which the determined preview video of the representative POI is provided on behalf of the POI group.

According to various embodiments, the first information may be a category of the POI and the second information may include at least one of a POI-related image, a name, and a distance from the current location of the electronic device, and the displaying to provide the first information or the second information may include displaying an icon corresponding to the category as a display for providing the first information; and displaying a UI including the second information as a display for providing the second information.

According to various embodiments, an operation method of an electronic device (e.g., the electronic device 101 of FIG. 1 or the electronic device 300 of FIG. 3) may include: transmitting location information of the electronic device to a CP server (e.g., the server 108 of FIG. 1); acquiring information on at least one POI located in the vicinity from the CP server; arranging the at least one POI according to a distance from the electronic device based on the location information of the electronic device; configuring a display position of each POI of the at least one POI based on a the location of the electronic device and a preview video capturing direction of the electronic device; configuring, when the display position is a focus POI within a configured focus region, information to be displayed in relation to the focus POI and displaying a UI including the configured information at the configured display position on the screen on which the preview video is displayed; and acquiring, when the display position is a general POI which is out of the configured focus region, category information of the general POI and displaying an icon corresponding to the category at the configured display position on the screen on which the preview video is displayed.

According to various embodiments, the method may further include: determining whether a POI group including at least one POI displayed as one display on the preview video screen can be generated; and generating, when the POI group can be generated, the POI group and selecting a representative POI for each POI group, wherein the displaying of the UI including the configured information includes displaying the UI including the configured information of the representative POI at the configured display position of the representative POI on the screen on which the preview video is displayed, and the displaying of the icon corresponding to the category includes displaying the icon corresponding to the category of the representative POI at the configured display position of the representative POI on the screen on which the preview video is displayed.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
    a communication module configured to perform communication with an external device;
    a camera module configured to capture a still image and a video;
    at least one processor configured to be operatively connected to the communication module and the camera module; and
    at least one memory configured to be operatively connected to the at least one processor,
    wherein the at least one memory stores instructions that, when executed, cause the at least one processor to:
        acquire a preview video captured by the camera module by controlling the camera module;
        acquire location information of the electronic device;
        acquire information on at least one point of interest (POI) located in a vicinity based on the location information;
        select a focus POI among at least one POI based on information on the at least one POI;
        determine first information to be provided to a user for general POIs among the at least one POI, the general POIs including remaining POIs except the selected focus POI;
        determine second information to be provided to the user for the focus POI, wherein the second information includes more information than the first information;
        determine a location on a screen on which a preview video in which the information on the at least one POI to be provided is to be displayed; and
        display the first information or the second information on the determined location on the screen on which a determined preview video of all or some of the at least one POI is provided,
    wherein the instructions further cause the at least one processor to:
        configure POIs whose distances between each other are within a predetermined distance as a POI group based on location information of each POI included in the information on the at least one POI or a location on a screen on which the information on the at least one POI is to be displayed;
        select a representative POI among the POIs within the POI group based on the information on the at least one POI or a user's preference; and
        display information on the representative POI to the location on the screen of the representative POI on behalf of the POI group.

2. The electronic device of claim 1, wherein the instructions further cause the at least one processor to:
    select a POI including advertisement and/or event information in the information on the at least one POI among the at least one POI as an advertisement POI;
    determine third information to be provided to the user for the advertisement POI, wherein the third information includes the advertisement and/or event information; and
    display the third information on the location on the screen on which a determined preview video is provided for the advertisement POI.

3. The electronic device of claim 1, wherein the instructions further cause the at least one processor to:
    select some POIs to be displayed on the screen on which the preview video is provided among the at least one POI based on a direction in which the camera module captures the preview video and an angle of view of the camera module; and
    display the first information or the second information on the location on the screen on which a determined preview video of each POI of the selected some POIs is provided.

4. The electronic device of claim 1, wherein the instructions further cause the at least one processor to:
    configure a condition corresponding to the focus POI; and
    select a POI in which the information on the at least one POI satisfies the condition corresponding to the focus POI as the focus POI.

5. The electronic device of claim 4, wherein the instructions further cause the at least one processor to:
    configure a partial region in the preview video as a focus region; and
    configure a POI of which actual location is included in the focus region as the condition corresponding to the focus POI.

6. The electronic device of claim 4, wherein the instructions further cause the at least one processor to:
    determine a distance between the electronic device and each POI based on the location information of the electronic device and location information of each POI included in the information on the at least one POI as the condition corresponding to the focus POI; and
    configure a POI in which the distance between the electronic device and the POI is within a predetermined value based on the determined distance between the electronic device and each POI.

7. The electronic device of claim 4, wherein the instructions further cause the at least one processor to configure a POI having a high preference based on the user's preference configured based on a user's behavior including a POI where the user has previously visited or a POI on which the user has previously searched for information as the condition corresponding to the focus POI.

8. The electronic device of claim 1, wherein the instructions further cause the at least one processor to:
    designate a portion on the screen on which the preview video is provided as a focus region; and
    display to provide the second information for the focus POI within the focus region.

9. The electronic device of claim 1, wherein the instructions further cause the at least one processor to:
    determine the first information to be a category of the POI;
    determine the second information to include at least one of a POI-related image, a name, or a distance from a current location of the electronic device;
    display an icon corresponding to the category to provide the first information; and
    display a user interface (UI) including the second information to provide the second information.

10. An operation method of an electronic device comprising:
    acquiring a preview video captured by a camera module;
    acquiring location information of the electronic device;
    acquiring information on at least one point of interest (POI) located in a vicinity based on the location information;

selecting a focus POI among at least one POI based on information on the at least one POI;
determining first information to be provided to a user for general POIs among the at least one POI, the general POIs including remaining POIs except the selected focus POI;
determining second information including more information than the first information to be provided to the user for the focus POI;
determining a location on a screen on which a preview video in which the information on the at least one POI to be provided is to be displayed; and
displaying the first information or the second information on the determined location on the screen on which a determined preview video of all or some of the at least one POI is provided,
wherein the operation method further comprising:
configuring POIs whose distances between each other are within a predetermined distance as a POI group based on location information of each POI included in the information on the at least one POI or a location on a screen on which the information on the at least one POI is to be displayed; and
selecting a representative POI among the POIs within the POI group based on the information on the at least one POI or a user's preference, and
wherein the displaying to provide the first information or the second information includes displaying to provide information on the representative POI to the location on the screen of the representative POI on behalf of the POI group.

11. The operation method of claim 10, further comprising:
selecting a POI including advertisement and/or event information in the information on the at least one POI among the at least one POI as an advertisement POI;
determining third information to be provided to the user for the advertisement POI, wherein the third information includes the advertisement and/or event information; and
displaying the third information on the location on the screen on which a determined preview video is provided for the advertisement POI.

12. The operation method of claim 10, wherein the displaying to provide the first information or the second information comprises:
selecting some POIs to be displayed on the screen on which the preview video is provided among the at least one POI based on a direction in which the camera module captures the preview video and an angle of view of the camera module; and
displaying the first information or the second information on the location on the screen on which a determined preview video of each POI of the selected some POIs is provided.

13. The operation method of claim 10, wherein the selecting of the focus POI among at least one POI comprises:
configuring a partial region in the preview video as a focus region; and
configuring a POI of which actual location is included in the focus region as the focus POI.

14. The operation method of claim 10, wherein the selecting of the focus POI among at least one POI comprises:
determining a distance between the electronic device and each POI based on the location information of the electronic device and location information of each POI included in the information on the at least one POI; and
selecting a POI in which the distance between the electronic device and the POI is within a predetermined value as the focus POI based on the determined distance between the electronic device and each POI.

15. The operation method of claim 10, wherein the determining of the location on the screen comprises:
designating a portion on the screen on which the preview video is provided as a focus region; and
determining the location within the designated focus region using the location on the screen on which the preview video in which the information on the focus POI is to be displayed is provided.

16. The operation method of claim 10, wherein:
the first information is a category of the POI;
the second information may include at least one of a POI-related image, a name, or a distance from a current location of the electronic device, and
wherein the displaying to provide the first information or the second information comprises:
displaying an icon corresponding to the category as a display for providing the first information; and
displaying a user interface (UI) including the second information as a display for providing the second information.

17. An operation method of an electronic device including a screen comprising:
transmitting location information of the electronic device to a content provider (CP) server;
acquiring information on at least one point of interest (POI) located in a vicinity from the CP server;
arranging the at least one POI according to a distance from the electronic device based on the location information of the electronic device;
configuring a display position of each POI of the at least one POI based on a location of the electronic device and a preview video capturing direction of the electronic device;
configuring, when the display position is a focus POI within a configured focus region, information to be displayed in relation to the focus POI and displaying a user interface (UI) including the configured information at the configured display position on the screen on which the preview video is displayed;
acquiring, when the display position is a general POI which is out of the configured focus region, category information of the general POI and displaying an icon corresponding to the category information at the configured display position on the screen on which the preview video is displayed;
determining whether a POI group including at least one POI displayed as one display on the preview video can be generated;
generating, when it is determined that the POI group can be generated, the POI group; and
selecting a representative POI for each POI group based on the information on the at least one POI or a user's preference.

18. The operation method of claim 17,
wherein the displaying of the UI including the configured information comprises displaying the UI including the configured information of the representative POI at the configured display position of the representative POI on the screen on which the preview video is displayed, and wherein the displaying of the icon corresponding to the category information comprises displaying the icon corresponding to the category information of the representative POI at the configured display position of the representative POI on the screen on which the preview video is displayed.

* * * * *